April 26, 1938.    F. J. BAST    2,115,677
REFRIGERATOR CONTROLLER
Filed Jan. 4, 1935    2 Sheets-Sheet 1
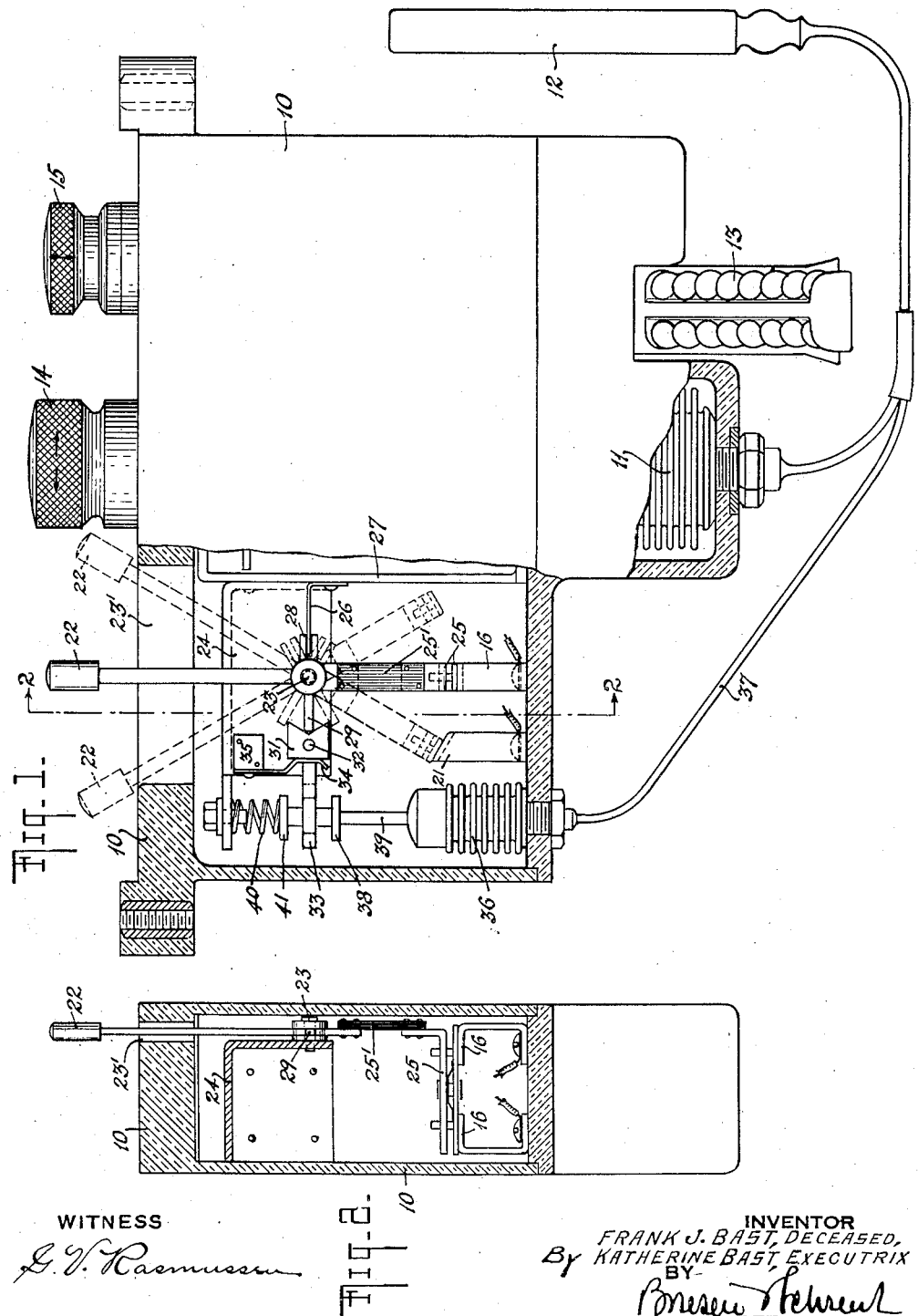
WITNESS
G. V. Rasmussen
INVENTOR
FRANK J. BAST, DECEASED,
By KATHERINE BAST, EXECUTRIX
BY
ATTORNEYS

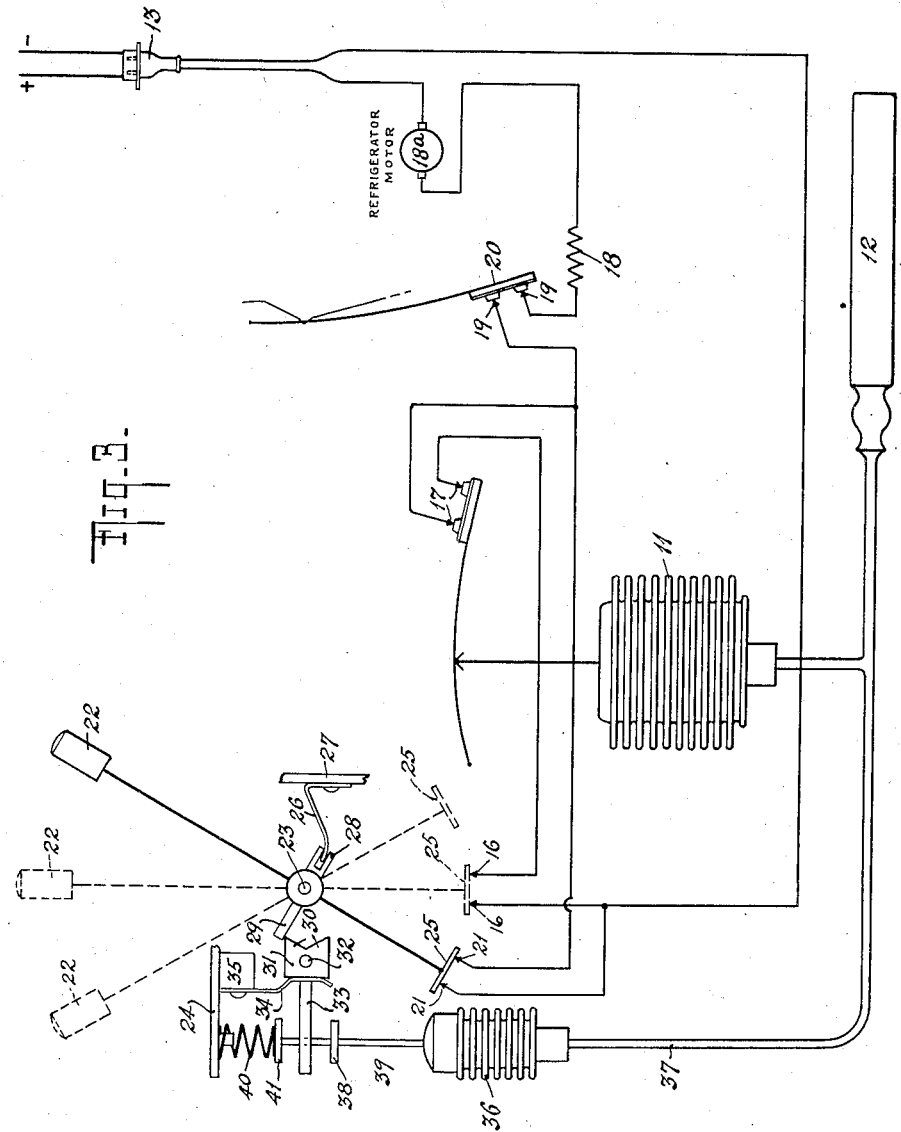

Patented Apr. 26, 1938

2,115,677

UNITED STATES PATENT OFFICE 2,115,677

REFRIGERATOR CONTROLLER

Frank J. Bast, deceased, late of Queens Village, N. Y., by Katherine Bast, executrix, Queens Village, N. Y., assignor to Charles J. Tagliabue Mfg. Co., Brooklyn, N. Y., a corporation of New York Application January 4, 1935, Serial No. 388

13 Claims. (Cl. 62—4)

The present invention relates to control mechanism for automatic refrigerators, and particularly to a mechanism wherewith the normal controlling functions of the controller mechanism may either be entirely suspended to secure rapid heating up of the expansion coil within the refrigerator to defrost the same, or else abnormally rapid and continuous cooling is caused to take place until a desired subnormal refrigerating temperature is reached when quick freezing is desired, the mechanism being restored automatically to its normal mode of control when the required degree of defrosting or freezing has been attained.

In the normal operation of automatic refrigerators, in which an expansion coil is located within the refrigerating compartment, such coils gradually receive an accumulation of ice which must be removed periodically, as it insulates the expansion coil and interferes with the maintenance of the desired temperature within the cooling compartments. It has heretofore been customary to effect defrosting of, for example, electric refrigerators, by turning off the switch to stop the motor until the coils have been defrosted, whereupon the switch is manually turned on again and the refrigerator placed under the supervision of the temperature controller. It frequently happens, however, that the attendant or housewife forgets to turn on the switch when the accumulated ice has been melted away, the temperature in the refrigerator then rising to such an extent that the food in the refrigerator is spoiled.

It has already been suggested to secure defrosting and insure automatic return of the temperature control to the temperature controller by modifying, by means of a manual adjustment of certain mechanism, one of the cycles of the refrigerator in such a way that the upper temperature limit of the cycle was raised to the point where defrosting occurred, the controller remaining operative and continuing to function in its usual manner, the adjustment being automatically corrected and the controller permitted to operate with the normal refrigerating cycle when such defrosting temperature has been reached. Similarly, devices have been proposed for modifying the cycle in such manner that an abnormally low temperature was reached, the temperature controller remaining always in operation and the switch controlling the motor being alternately closed and opened in the course of the successive cycles, and the normal cycle being restored after a predetermined number of "abnormal" cycles have taken place. See, for example, the patents to King, Nos. 1,658,340, 1,658,341, and 1,658,342.

It is an object of the present invention to provide a simple and reliable control mechanism wherewith a defrosting temperature or an abnormally low temperature may be quickly obtained independently of any control by the usual temperature controller of the refrigerator. The present invention thus contemplates an arrangement wherein the usual temperature responsive mechanism is rendered temporarily ineffective upon the motor switch, or upon the gas valve in the case of a gas-operated refrigerator, when an abnormally high or an abnormally low temperature is desired, the normal control being, however, automatically restored to the controller when such abnormal temperature is reached, the normal or selected cycle of the controller thus remaining unaffected and the temperature (or pressure) limits thereof remaining substantially unchanged.

The present invention accordingly provides a semi-automatic defrosting and quick freezing control wherein after the normal controller has been manually cut out to obtain a defrosting temperature or an abnormally low temperature, and such temperature has been reached, the normal temperature controlling function is automatically brought back into action.

According to the present invention there is provided what may be termed a master control for the usual temperature controller of an automatic refrigerator, such master control being operable to suspend the functions of the temperature controller and hold the same in abeyance either to secure defrosting, or to cause the compressor or equivalent device (such as a gas feeding valve) to operate continuously to cause quick freezing, and such master control operating automatically to restore the control of the temperature to the temperature controller and permit the latter to exercise its normal functions after the abnormal temperature has been attained. The improved master controller mechanism can thus be adjusted to secure continuous increase of temperature or continuous decrease of temperature until a predetermined temperature level is reached, for defrosting or quick freezing, respectively, whereupon the energy supplying means is automatically again placed under the supervision of the temperature controller. The supply of energy to the refrigerator is thus either cut out completely until defrosting is completed or is supplied continuously until the desired subnormal temperature is obtained, the defrosting or quick freezing being accomplished in a manner independent of the characteristics of the selected cycle of the temperature controller, such cycle remaining unchanged.

The present invention, while it embraces also other types of refrigeration, is particularly applicable to refrigerators of the compression type which are provided with an electric motor, a compressor, a condenser, and an evaporator or expansion coil, and the invention will be further described by way of example as embodied in a refrigerator of this kind.

In the embodiment of the invention illustrated on the accompanying drawings, Fig. 1 is a horizontal section through the temperature controller and the associated master controller; Fig. 2 is a section through Fig. 1 along the line 2—2 of Fig. 1, and Fig. 3 represents the wiring diagram of the complete arrangement.

The entire mechanism may be mounted upon or housed within a casing 10 of a synthetic molding composition or other insulating material. The selected normal refrigerating temperature range in the cooling compartments of the refrigerator may be maintained by any suitable or known mechanism. This normal temperature control mechanism may be housed in the right-hand part of the casing 10 and may include an expansible bellows 11, a thermostatic bulb 12, an electric plug 13, an adjusting member 14 for varying the controlled temperature range, and a plunger 15 for restoring the parts to the operative condition upon opening of the electric circuit by safety mechanism responsive to an excessive current in the motor circuit. As these mechanisms are known in the art and form no part of the present invention, it has not been deemed necessary to show the same in detail except as they are diagrammatically shown in Fig. 3, as described below.

According to the present invention there is provided mechanism which temporarily suspends the control by the normal control mechanism of the refrigerator and is adjustable to produce either a rapid defrosting of the expansion coils of the refrigerator by permitting the temperature to rise quickly to a predetermined value above the normal cold temperature of the refrigerating compartment, or to effect rapid freezing by causing the temperature to fall quickly to a predetermined temperature below the average normal controlled refrigerating temperature. In the form of the invention illustrated, the mechanism includes a pair of contacts 16 (Fig. 3) arranged in series with the contacts 17 controlled by the thermostatic bellows 11 and its associated mechanism (shown only schematically in Fig. 3) with the heating coil 18 forming part of the safety or overload device, and with the motor 18a of the refrigerator. The contacts 16 and 17 are also in series with the contacts 19 controlled by the overload switch 20 which normally is in the closed position but is automatically opened when the current through the motor exceeds a maximum safe value. A second pair of contacts 21 is likewise located in the left-hand end of the housing 10, and as shown in Fig. 3 is arranged in series with the safety switch 19, 20 but shunts the switch 17, so that the circuit through the pairs of contacts 21 and 19 is independent of the condition of the switch 17.

The contacts 16 and 21 are controlled by a manually operable lever 22 which is pivoted at 23 upon a bracket 24 (see Fig. 2) fixed within the housing 10, the lever extending through a slot 23' in the housing 10 to be engageable from the exterior of the housing. The arm 22 carries a jumper or switch 25 insulated from the main body of the arm by an insulating connection 25'. The switch 25 is adapted to bridge the contacts 16 or 21 or to remain in idle position depending upon whether the upper portion of the lever 22 is in a normal vertical position, in the right-hand position or in the left-hand position, respectively, as indicated in Fig. 1.

The switch lever 22 is resiliently held in its vertical position by means of a plate spring 26 fixed to a frame 27 or to any other stationary member within the housing 10, the free end of the spring engaging between the prongs of a forked member 28 fixed to the switch lever 22. The lever is provided also with a finger 29 which normally is positioned between the oppositely inclined walls 30 of a latch member 31 pivotally mounted upon a pin 32 extending from the bracket 24, a bar 33 projecting from the member 31 for a purpose which will be described hereinbelow. The latch member 31 is normally held in the position shown in Fig. 1 by a plate spring 34 fixed to a support 35 mounted upon the bracket 24, the spring 34 urging the latch 31 into the position shown in Fig. 1.

In the normal vertical position of the switch arm 22, shown in full lines in Fig. 1, the contacts 16 are closed by the jumper 25 and the temperature in the refrigerator is accordingly controlled by the controller mechanism of which the bellows 11 or equivalent mechanism forms a part, the switch 17 being closed automatically when the temperature in the refrigerator rises to a predetermined value and being opened when such temperature falls to another predetermined value so as to maintain a selected average refrigerating temperature in the food compartment of the refrigerator. It will be understood that during the normal operation of the apparatus, the switch 20 is closed and becomes automatically opened when for any reason an excessive current passes through the motor. When the switch 20 is opened by the overload or other safety device, it can be closed manually by the plunger 15 or any other suitable mechanism.

To effect defrosting of the refrigerator, the lever 22 is moved into the left-hand position shown in dotted lines in Fig. 1, the contacts 16 being then opened. The temperature in the refrigerator is now no longer under the supervision of the controller mechanism 11 and the temperature accordingly rises. Upon movement of the lever 22 to the left, the finger 29 tilts the latch 31 in a clockwise direction until it clears the lower edge of the latch, whereupon the latter is swung back into its normal position by the spring 34 and thereby acts as a stop which resists return of the lever to the original position. At the same time the spring 26 is distorted and placed under tension, but so long as the lever 22 is locked in adjusted position by engagement of the finger 29, under the lower edge of the latch 31, it is unable to swing the lever 22 into the vertical position. The final position of the finger 29 is indicated in dotted lines in Fig. 1 below the lower right-hand edge of the latch 31.

As soon as the temperature in the refrigerator has risen to a predetermined value, a bellows 36 communicating through a capillary tube 37 with the interior of the bulb 12 expands to such a degree that a collar 38 mounted upon a rod 39 engaged by or connected with the bellows 36 moves upwardly against the pressure of a spring 40 to cause tilting of the bar 33 to such an extent that the lower right-hand edge of the latch 31 clears the finger 29, whereupon the lever 22 is returned to its vertical position by the spring 26 which in the meantime had been under tension. The circuit is then again closed at the contacts 16 and the temperature in the refrigerator is again restored to the control of the normal controlling mechanism of which the bellows 11 forms a part. As the temperature in the refrigerator falls, the bellows 36 contracts and the bar 33 and latch 31 return to the Fig. 1 position.

To effect rapid cooling of the refrigerator, for example, to freeze ice cream quickly, the lever 22 is thrown into the right-hand position, during which movement the latch 31 is rotated counter-clockwise until the finger 29 clears the upper right-hand edge of the same, whereupon the latch again assumes the position shown in Fig. 1. The spring 26 is then again placed under tension but is resisted by the stronger spring 34, so that the lever remains in the right-hand position. When a predetermined low temperature is reached, the bellows 36 contracts to such a degree that a collar 41 on the rod 39 engages the bar 33 and rotates the same in a counterclockwise direction about the pivot 32 until the latch 31 clears the finger 29, whereupon the lever 22 is returned to the normal vertical position by the spring 26. The refrigerator is then again restored to the control of the normal controller mechanism. As the temperature in the refrigerator rises, the bellows will expand to raise the collar 41 sufficiently to permit the bar 33 and latch 31 to assume the Fig. 1 position.

It will be understood that the maximum defrosting temperature and also the lowest cold temperature can readily be adjusted by suitably determining the characteristics of the bellows 36, by adjusting the collars 38 and 41 on the rod 39, by adjusting the tension of the spring 40, and by varying the degree to which the finger 29 projects beyond the upper or lower edge of the latch 31.

From the above, it will be seen that an extremely simple device is provided which is manually operated to secure either a defrosting temperature or an abnormally low temperature, and which automatically is restored to its original position to return the temperature control of the refrigerator to the normal temperature controller 11 and thus does not require the attention of the attendant or housekeeper after it has been thrown to the left-hand or right-hand position. The abnormally low or high temperature is secured without disturbing the normal cycle of the refrigerator, that is, the normal or selected circuit-opening and circuit-closing temperatures. The mechanism can thus be set for obtaining a relatively high defrosting temperature without at the same time disturbing the lower control point of the cycle; that is, a high defrosting temperature can be obtained without changing the temperature range or differential of the selected cycle at which the controller normally operates. Similarly, an unusually low temperature can be secured temporarily without changing the range or differential of the normal cycle. It will be noted that this improved mechanism may be associated with any type of temperature controller, requiring only that the contacts 16 and 21, in the case of an electric refrigerator, be connected in the circuit which is controlled by the controller and that the bellows 36 be connected with the bulb 12. If desired, the bellows 36 may be provided with a separate thermostatic bulb, or any equivalent temperature or pressure responsive device may be employed, such as a mechanism responsive to changes in the pressure at the suction side of the compressor. It will be understood that in the case of a gas refrigerator, the lever 22 or equivalent device can be made to close a gas valve in series with that controlled by the automatic controller when rapid defrosting is desired, or to open a valve not under the control of the controller when rapid freezing is required. It will be clear that this improved mechanism can be associated with a controller of any type having adjusting means for varying the range and/or the differential of the maximum and minimum temperatures of a cycle.

What is claimed is:

1. In an electric refrigerator, the combination with a temperature controller including a switch arranged to control contacts located in the circuit of the motor of the refrigerator, and temperature responsive mechanism arranged to operate the switch to maintain a selected average refrigerating temperature in the refrigerator, of mechanism for securing an abnormally high temperature for defrosting or an abnormally low temperature for quick freezing in the refrigerator without disturbing the selected normal operating cycle of the controller, comprising contacts in the motor circuit in series with the switch, a second circuit for the motor in parallel with the switch and having controlled contacts therein, and a switch normally closing the second mentioned contacts and manually movable to a position in which both the second and third mentioned contacts are open and to a position in which the third mentioned contacts are closed, and means responsive to the abnormal temperature condition to restore the second-mentioned switch automatically to its normal condition in which the second mentioned contacts are closed and the third contacts open.

2. The combination as set forth in claim 1, wherein said means comprises an expansible bellows operable upon expansion thereof to the degree corresponding to the defrosting temperature and upon contraction thereof to the degree corresponding to the abnormally low temperature, to throw the second mentioned switch into the normal position.

3. The combination according to claim 1, including a spring arranged to urge the second-mentioned switch into its normal position, and a latch device yieldingly holding said switch in its defrosting or freezing positions against the tension of said spring.

4. In an electric refrigerator, the combination with a temperature controller including switch-controlled contacts located in the circuit of the motor of the refrigerator, and control mechanism arranged to operate the switch to maintain a selected average refrigerating temperature in the refrigerator, of mechanism for securing an abnormally high temperature for defrosting or an abnormally low temperature for quick freezing in the refrigerator without disturbing the selected normal operating cycle of the controller, comprising contacts in the motor circuit in series with the first mentioned switch, a second circuit for the motor parallel with the first mentioned circuit and having controlled contacts therein, a switch lever normally closing the second mentioned contacts and manually movable to a position in which both the second and third mentioned contacts are open and to a position in which the third mentioned contacts are closed and the second-mentioned contacts open, latch mechanism for holding the lever in any of its selected positions, and means responsive to an abnormal temperature condition to trip the latch mechanism, and restore the lever automatically to its normal position in which the second mentioned contacts are closed.

5. The combination as set forth in claim 1, wherein the temperature responsive mechanism and said means each includes an expansible bellows, and a single thermostatic bulb connected to both bellows.

6. In an electric refrigerator, the combination with a temperature controller including a switch arranged to control contacts located in the circuit of the motor of the refrigerator, and temperature responsive mechanism arranged to operate the switch to maintain a selected average refrigerating temperature in the refrigerator, of mechanism for securing an abnormally high temperature for defrosting or an abnormally low temperature for quick freezing in the refrigerator without disturbing the selected normal operating cycle of the controller, comprising contacts in the motor circuit in series with the switch, a second circuit for the motor parallel with the switch and having controlled contacts therein, and a switch normally closing the second mentioned contacts and manually movable to a position in which both the second and third mentioned contacts are open and to a position in which the third mentioned contacts are closed, and means responsive to the abnormal temperature condition to restore the second mentioned switch automatically to its normal condition in which the second mentioned contacts are closed and the third contacts open, said responsive means including a spring arranged to urge the second mentioned switch into its normal position, and a latch device yieldingly holding said switch in its defrosting or freezing positions against the tension of said spring, said latch device comprising a pivoted bar, a latch member mounted on said bar, an expansible bellows responsive to the conditions in the refrigerator, and an abutment member upon each side of said bar and controlled by said expansible bellows and adapted to oscillate the bar in one or the other direction to release the switch as the bellows expands to the defrosting temperature or contracts to the freezing temperature.

7. A switch mechanism suitable for use with the normal temperature controller of an automatic refrigerator to establish quick freezing and defrosting conditions in the refrigerator, comprising two pairs of contacts, one arranged in series and the other in parallel with the motor circuit contacts controlled by the normal controller, a manually operable switch member normally closing the first pair of contacts to maintain the controller effective to maintain a selected average temperature in the refrigerator, and being movable to open said first pair of contacts and close the second pair of contacts and also into non-contact-closing position, to maintain the circuit continuously closed or open, respectively, without supervision by the controller, and temperature responsive mechanism acting when a predetermined freezing or defrosting temperature, respectively, is reached to return the switch member into its normal position in which it restores the effective control of the temperature to said controller.

8. A switch mechanism as set forth in claim 7 including tensioning means arranged to be placed under strain when the switch member is moved to a non-normal position and urging said member to return to such normal position, a latch element for locking the switch member in its shifted position, and a member moved by said temperature responsive mechanism for tripping the latch device to enable the spring means to return the switch member to normal position.

9. A switch mechanism suitable for use with the normal temperature controller of an automatic refrigerator to establish abnormal temperature conditions in the refrigerator comprising a pair of contacts associated with the circuit of the refrigerator motor, a manually operable switch member having a normal position with reference to said contacts wherein the circuit is under the control of the temperature controller, and movable to a different position with reference to said contacts to cause suspension of the control of the circuit by said controller, whereby the temperature in the refrigerator changes progressively in one direction, said member being movable at will to the different positions at all times, and temperature responsive mechanism acting when a predetermined abnormal temperature is reached to return the switch member to its normal position in which the effective control of the temperature is restored to the controller.

10. In a refrigeration controlling circuit, a switch for normally maintaining the temperature within normal limits; three-position switch means including a manually operable member biased toward a central position and adapted to respectively close said circuit continuously, open said circuit continuously, and operably connect said first-named switch, in said circuit; a latch member biased to a normal central position and adapted and arranged to coact with said member to then retain the latter in its either continuously open or closed position; temperature responsive means; and lost-motion means operatively connecting said temperature responsive means and said latch member to tilt the latter from its normal position to release said member and permit the return thereof to its normal position upon the attainment of an abnormal temperature.

11. In a refrigerator controller, the combination of a switch mechanism adapted to be associated with a circuit governing the refrigerating action; a manually operable member movable to three different positions for setting said switch mechanism to conditions corresponding respectively with a normal temperature range in the refrigerator, an abnormally high temperature for defrosting, and an abnormally low temperature for quick freezing, said member being biased to its normal position; latch mechanism for holding said member in either defrosting or freezing position; and temperature responsive mechanism operatively associated with one portion of said switch mechanism for maintaining the normal range of temperature only when said member is in its normal position and operatively associated with said member when the latter is in either abnormal position only upon the attainment of the corresponding abnormal temperature to then initiate the return of said member to its normal position; said latch mechanism comprising a latch element engageable by said member and rotatable thereby to enable said member to clear the same as it is moved to either defrosting or freezing position, said member being then held by said latch element against return to normal position; and another and independently operable portion of said temperature responsive mechanism and said latch element being adapted and arranged to shift the latch element to enable said member to clear the same and return to its normal position when either abnormal temperature limit is reached.

12. A refrigeration temperature regulating system comprising, in combination, temperature responsive means, including a regulating portion for cyclically lowering the temperature to normally maintain the average temperature constant within a predetermined range; means for continuously lowering the temperature; selective mechanism manually positionable respectively to operatively connect either of said means and to a position to operatively disconnect both of said means, said mechanism being biased to its normal position; other temperature responsive means; detent means effective in its normal position to retain said selective mechanism in the last-set abnormal position of the latter; and means operatively connecting said temperature responsive means with said detent means to release the selective mechanism when the temperature goes outside the predetermined range following the temperature range resulting from the manual setting of said selective mechanism to either abnormal position.

13. The combination as set forth in claim 12, wherein the temperature responsive means each includes an expansible bellows and a single thermostatic bulb connected to both bellows.

KATHERINE BAST,
*Executrix of the Estate of Frank J. Bast, Deceased.*